(12) United States Patent
Ricci (10) Patent No.: US 10,379,717 B2
(45) Date of Patent: *Aug. 13, 2019

(54) DEVICE BASED VISUALIZATION AND ANALYSIS OF MULTIVARIATE DATA

(71) Applicant: Accenture Global Solutions Limited, Dublin (IE)

(72) Inventor: Alessio Ricci, Rome (IT)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,312

(22) Filed: Dec. 22, 2017

(65) Prior Publication Data
US 2018/0122105 A1    May 3, 2018

Related U.S. Application Data

(63) Continuation of application No. 15/142,982, filed on Apr. 29, 2016, now Pat. No. 9,852,524.

(51) Int. Cl.
*G06F 3/0484* (2013.01)
*G06T 11/20* (2006.01)

(52) U.S. Cl.
CPC ........ *G06F 3/04842* (2013.01); *G06T 11/206* (2013.01)

(58) Field of Classification Search
CPC ......... G06F 17/30716; G06F 17/30713; G06F 17/30601; G06F 19/26; G06T 11/206
See application file for complete search history.

(56) References Cited

U.S. PATENT DOCUMENTS

| 9,852,524 | B2 | 12/2017 | Ricci |
| 2002/0188424 | A1 | 12/2002 | Grinstein |
| 2013/0097177 | A1 | 4/2013 | Fan |
| 2016/0098177 | A1 | 4/2016 | Kraut |

*Primary Examiner* — Antonio A Caschera
(74) *Attorney, Agent, or Firm* — Harrity & Harrity, LLP (57) ABSTRACT

A device may receive input data regarding a particular field of analysis. The device may determine a mapping of a set of metrics of the input data to a set of coordinates. The device may generate a representation of the set of metrics based on the mapping of the set of metrics. A group of pixels may be caused to provide a particular visualization corresponding to a value of a particular metric mapped to a particular coordinate based on the mapping of the set of metrics. The device may provide a plurality of versions of the representation. The particular metric may map to the particular coordinate in each of the plurality of versions of the representation. The plurality of versions of the representation being associated with one or more changes to a particular parameter of the input data.

20 Claims, 7 Drawing Sheets

DEVICE BASED VISUALIZATION AND ANALYSIS OF MULTIVARIATE DATA

RELATED APPLICATION

This application is a continuation of U.S. patent application Ser. No. 15/142,982, filed Apr. 29, 2016 (now U.S. Pat. No. 9,852,524), which is incorporated herein by reference.

BACKGROUND

A device (e.g., a server) may obtain data including multiple metrics associated with a subject of analysis. For example, the device may obtain information identifying a set of key performance indicators (KPIs) relating to a telecommunications network, a set of biostatistics regarding a group of people, a set of environmental measurements related to a climate of one or more areas, or the like. The device may provide information identifying the multiple metrics for display via a user interface. For example, the device may provide, for display, a set of values of the set of KPIs, a graph of the set of biostatistics, or the like. The adoption of Internet of Things (IoT) has resulted in a significant increase in the amount of data that may be obtained by the device and for which the device may be utilized to provide a visualization. However, the device may require excessive utilization of processing resources to generate a complex visualization of the multiple metrics or a user may be required to have specialized knowledge of the subject of analysis to generate a custom visualization solution for the multiple metrics

SUMMARY

According to some implementations, a device may include one or more processors. The one or more processors may receive input data. The input data may include a set of metrics regarding a particular field of analysis. The one or more processors may determine a mapping of the set of metrics of the input data to a set of coordinates. The one or more processors may generate a representation of the set of metrics based on the mapping of the set of metrics to the set of coordinates. A group of pixels, associated with a particular coordinate of the set of coordinates, may be caused to provide, for display, a particular visualization corresponding to a value of a particular metric, of the set of metrics, mapped to the particular coordinate based on the mapping of the set of metrics to the set of coordinates. The one or more processors may provide, for display via a user interface, a plurality of versions of the representation. The particular metric may map to the particular coordinate in each of the plurality of versions of the representation. The plurality of versions of the representation may be associated with one or more changes to a particular parameter of the input data.

According to some implementations, a non-transitory computer-readable medium may store instructions. The one or more instructions, when executed by one or more processors, cause the one or more processors to obtain a first set of metrics from a set of data sources. The first set of metrics may be related to a first value of a particular parameter. The one or more instructions, when executed by one or more processors, cause the one or more processors to identify a set of coordinates for the first set of metrics based on a quantity of metrics included in the first set of metrics. The one or more instructions, when executed by one or more processors, cause the one or more processors to generate a mapping of each metric, of the first set of metrics, to a coordinate of the set of coordinates. The one or more instructions, when executed by one or more processors, cause the one or more processors to select a visualization for each coordinate, of the set of coordinates, based on a value of a corresponding metric of the first set of metrics. The one or more instructions, when executed by one or more processors, cause the one or more processors to provide a user interface for display based on selecting the visualization for each coordinate. The user interface may include pixels representing the visualization at each coordinate. The one or more instructions, when executed by one or more processors, cause the one or more processors to receive a second set of metrics from the set of data sources after providing the user interface for display. The second set of metrics may be related to a second value of the particular parameter. The one or more instructions, when executed by one or more processors, cause the one or more processors to map the second set of metrics to the set of coordinates based on the mapping of the first set of metrics to the set of coordinates. The one or more instructions, when executed by one or more processors, cause the one or more processors to update the user interface to provide another visualization for each coordinate. The other visualization for each coordinate may be associated with the second set of metrics.

According to some implementations, a method may comprise obtaining, by a device, a plurality of metrics. A particular metric, of the plurality of metrics, may have a first particular value associated with a first value of a parameter and a second particular value associated with a second value of the parameter. The method may comprise mapping, by the device, the plurality of metrics to a plurality of coordinate locations. The particular metric may be mapped to a particular coordinate location. The method may comprise generating, by the device, a first representation of the plurality of metrics based on mapping the plurality of metrics to the plurality of coordinate locations and based on the first particular value of the parameter. The particular coordinate location in the first representation may be associated with representing the first particular value of the particular metric. The method may comprise generating, by the device, a second representation of the plurality of metrics based on mapping the plurality of metrics to the plurality of coordinate locations and based on the second value of the parameter. The particular coordinate location in the second representation may be associated with representing the second particular value of the particular metric. The method may comprise providing, by the device, information associated with the first representation or the second representation.

DETAILED DESCRIPTION

The following detailed description of example implementations refers to the accompanying drawings. The same reference numbers in different drawings may identify the same or similar elements.

A subject of analysis, such as a telecommunications network, a climate for a particular location, a group of people, or the like may be associated with multiple metrics. For example, a device may determine, for a telecommunications network, a set of signal strengths, a set of bit error rates, a set of user device identifiers of user devices connected to the telecommunications network, or the like. Similarly, a device may determine, for a group of people, a set of blood pressures, a set of blood types, a set of social networks, a set of mental health statuses, or the like. The device may obtain data identifying multiple metrics regarding the subject of analysis, and may provide information identifying the data for display. For example, the device may provide a set of values for the multiple metrics, a graph representing a trend for the multiple metrics, a set of statistical measurements relating to the multiple metrics (e.g., a mean value, a median value, or a standard deviation value), or the like.

With the adoption of the Internet of Things (IoT) and wearable devices, the amount of data that can be collected about a subject has increased dramatically. For example, smart sensors may be deployed to multiple locations to collect multiple sets of climate metrics. Similarly, wearable devices permit collection of biostatistics regarding the users of the wearable devices. However, as a quantity of data increases, it may be difficult to provide the multiple metrics for display in a single, readable user interface. Moreover, a user may require specialized knowledge of the subject of analysis to understand a significance of the multiple metrics. Furthermore, performing a complex analysis of the multiple metrics may require excessive utilization of processing resources, storage resources, or the like as the quantity of metrics increases.

Implementations, described herein, may map a set of key performance indicators (KPIs) to a set of coordinates to generate a graphical representation of the set of KPIs. Moreover, an image analysis technique may be performed to analyze the graphical representation of the set of KPIs, thereby permitting sets of KPIs to be compared across different times, locations, people, or the like without requiring specialized analysis solutions. Furthermore, a user interface may be generated to provide the graphical representation of the set of KPIs, thereby permitting a user to understand the set of KPIs despite an increase in a quantity of KPIs. In this way, a utilization of processing resources may be reduced relative to performing a complex statistical analysis of large quantities of metrics. Moreover, based on providing a user interface that is easier to understand than a set of values of a large quantity of metrics, a user may determine a meaning of the metrics in a reduced quantity of time, thereby reducing utilization of processing resources, network resources, or the like.

Figure 1:
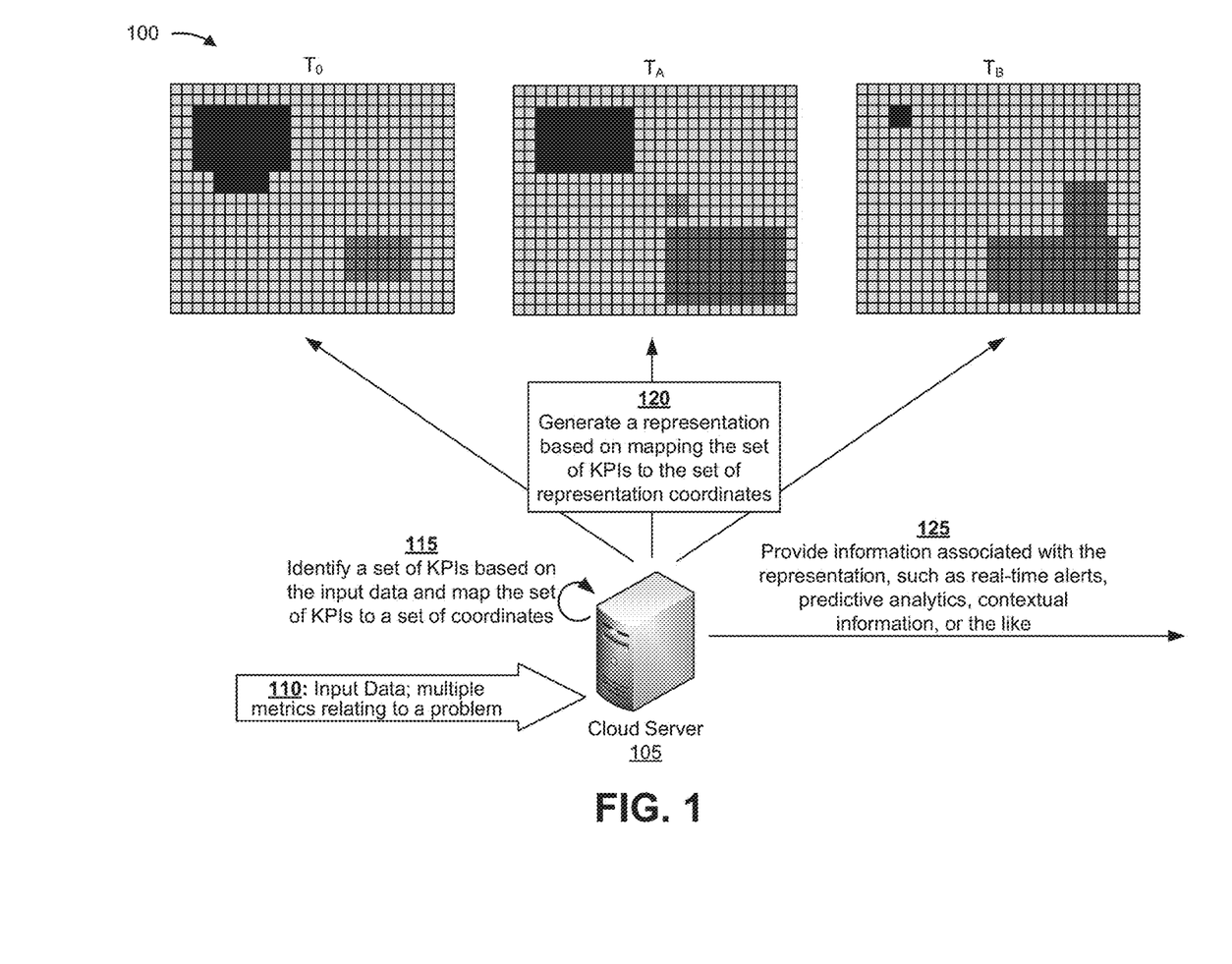
FIG. 1 is a diagram of an overview of an example implementation described herein.

FIG. 1 is a diagram of an overview of an example implementation 100 described herein. As shown in FIG. 1, example implementation 100 includes a cloud server 105.

As further shown in FIG. 1, and by reference number 110, cloud server 105 may receive input data relating to a problem for analysis. For example, cloud server 105 may receive information identifying multiple metrics (e.g., 100 metrics, 1,000 metrics, or 10,000 metrics) relating to particular field (e.g., a telecommunications field, a healthcare field, a climate field, a natural resource extraction field, or a financial field of analysis). As shown by reference number 115, cloud server 105 may identify a set of KPIs based on the input data, and may map the set of KPIs to a set of coordinates. For example, cloud server 105 may select a subset of the multiple metrics as the set of KPIs, may parse the multiple metrics to identify one or more KPIs (e.g., based on an analysis technique), or the like. Cloud server 105 may utilize multiple portions of the data to select the set of KPIs. For example, cloud server 105 may utilize a training set portion of the data to perform a machine learning technique to select one or more candidate KPIs, and may utilize a verification set portion of the data to confirm the one or more candidate KPIs as the set of KPIs.

Cloud server 105 may map the set of KPIs to the set of coordinates based on a data structure. For example, cloud server 105 may generate a matrix (e.g., of coordinate locations) including a set of data entries corresponding to the set of KPIs. Cloud server 105 may store information indicating the mapping of the set of KPIs to the set of representation coordinates to permit multiple representations (e.g., multiple versions of a representation) to be generated. A version of the representation may refer to an instance of the representation with a set of metrics sharing a common parameter (e.g., a common time step identifier, a common geographic location identifier, a common service identifier, or a common person identifier). For example, cloud server 105 may store mapping information to permit generation of a first representation relating to a first set of KPIs associated with a first person and a second representation relating to a second set of KPIs associated with a second person. In this case, a first blood pressure KPI for the first person and a second blood pressure KPI for a second person may map to the same coordinate in the first representation and the second representation. Similarly, cloud server 105 may store the mapping information to cause corresponding KPIs associated with multiple time steps, multiple locations, or the like to be mapped to a common coordinate. In this way, cloud server 105 permits a graphical comparison of a group of sets of KPIs associated with a group of people, time steps, locations, or the like.

As further shown in FIG. 1, and by reference number 120, cloud server 105 generates a representation (e.g., multiple versions of the representation at multiple time steps $T_0$, $T_A$, and $T_B$) based on mapping the set of KPIs to the set of coordinates. A representation may refer to a representation of the set of KPIs mapped to the set of coordinates. For example, cloud server 105 may assign a visualization to a particular KPI (e.g., a shading, a coloring, or a patterning of a group of pixels), and may cause a portion of the representation at a coordinate location corresponding to the particular KPI to include the visualization. Although implementations, described herein, are described in terms of a visualization of a value of a particular KPI, implementations, described herein, may also utilize other information to represent the value of the particular KPI, such as a frequency of audio associated with a particular coordinate location of an audio coordinate system, an amplitude of the audio, a video image, or the like. Cloud server 105 may normalize the set of KPIs to assign a set of visualizations to the set of KPIs. For example, cloud server 105 may normalize a value of a particular KPI on a particular scale (e.g., a 0 to 1 scale, a −1 to 1 scale, or a 0 to 100 scale), and may assign a shade (e.g., a visual shade) to the particular KPI based on a normalized value of the particular KPI (e.g., white for 0, light gray for 0.25, medium gray for 0.5, dark gray for 0.75, and black for 1 on a scale of 0 to 1).

As further shown in FIG. 1, and by reference number 125, cloud server 105 provides information associated with the representation. For example, cloud server 105 may provide a user interface (e.g., for display) including the representation at the multiple time steps. Cloud server 105 may perform an image processing technique, such as a pattern recognition technique, a shape recognition technique, or the like to analyze the representation, and may provide information associated with analyzing the representation. For example, cloud server 105 may determine that a particular shape, created by a set of visualizations representing a set of KPIs at a set of coordinates, corresponds to a particular medical diagnosis, a particular weather pattern, a particular telecommunications network status, a particular financial market activity, or the like. In this way, cloud server 105 provides information based on the multiple metrics utilizing existing image processing techniques applied, thereby reducing a difficulty in analyzing multiple metrics relative to requiring a custom analysis solution to be created for each field of a set of fields.

In another example, cloud server 105 may provide predictive analytics relating to the representation. For example, based on a change to the representation at multiple time steps, cloud server 105 may predict a likelihood of an occurrence of an event, such as a prospective medical diagnosis, a prospective weather pattern, or the like. In another example, cloud server 105 may provide overlay contextual information with the representation, such as information identifying a type of metric mapped to a particular coordinate location, a geographic location represented by a group of metrics at a group of neighboring coordinate locations, or the like. In another example, cloud server 105 may generate a set of alerts based on the representation. For example, cloud server 105 may determine that the representation at a particular time step corresponds to a threshold likeliness of rain within a threshold period of time, and may transmit an alert to a set of user devices to proactively warn users of the set of user devices about the rain.

In this way, cloud server 105 provides information relating to multiple metrics and/or multiple KPIs based on generating a graphical representation. Moreover, based on utilizing the graphical representation, cloud server 105 can receive multiple different types of data relating to multiple different fields for inclusion into a graphical representation, and can utilize an image analysis of the graphical representation without requiring a custom analytics solution for each different type of data. Furthermore, based on utilizing the representation, cloud server 105 reduces a utilization processing resources relating to generating information based on the multiple metrics, providing information based on the multiple metrics, and analyzing the multiple metrics (e.g., to perform a diagnosis or a prediction) relative to utilizing complex statistical or analytical techniques.

As indicated above, FIG. 1 is provided merely as an example. Other examples are possible and may differ from what was described with regard to FIG. 1.

Figure 2:
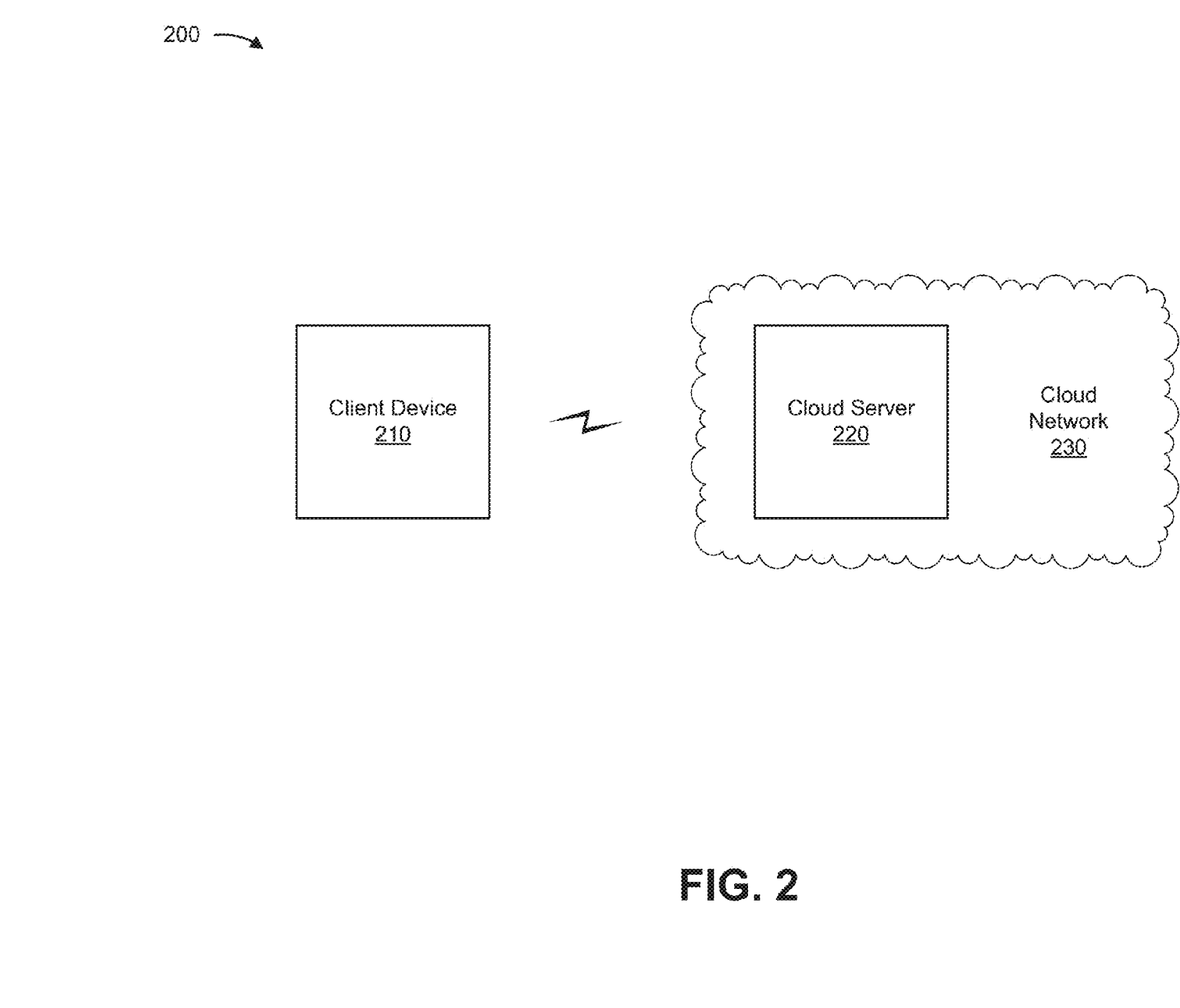
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a cloud server 220, and a cloud network 230. Devices of environment 200 may interconnect via wired connections, wireless connections, or a combination of wired and wireless connections.

Client device 210 includes one or more devices capable of receiving, generating, storing, processing, and/or providing information associated with a representation of data (e.g., multiple metrics or multiple KPIs). For example, client device 210 may include a communication and/or computing device, such as a mobile phone (e.g., a smart phone or a radiotelephone), a computer (e.g., a laptop computer, a tablet computer, a handheld computer, or a desktop computer), a wearable communication device (e.g., a smart wristwatch or a pair of smart eyeglasses), or a similar type of device. In some implementations, client device 210 may provide, for display, a user interface including analytics information regarding the representation of data, such as a recommendation determined based on the representation of data, a prediction performed based on the representation of data, or the like. In some implementations, client device 210 may receive information from and/or transmit information to another device in environment 200.

Cloud server 220 includes one or more devices capable of storing, processing, and/or routing information associated with a representation of data (e.g., multiple metrics or multiple KPIs). For example, cloud server 220 may include a server that is associated with obtaining data and causing a set of visualizations corresponding to the data to be provided at a set of coordinates of a representation. In some implementations, cloud server 220 may include a communication interface that allows cloud server 220 to receive information from and/or transmit information to other devices in environment 200. In some implementations, cloud server 220 corresponds to cloud server 105 in FIG. 1. While cloud server 220 is described as a resource in a cloud computing network, such as cloud network 230, cloud server 220 may operate external to a cloud computing network, in some implementations.

Cloud network 230 includes an environment that delivers computing as a service, whereby shared resources, services, etc. may be provided by cloud server 220 to store, process, and/or route information associated with a representation of data. Cloud network 230 may provide computation, software, data access, storage, and/or other services that do not require end-user knowledge of a physical location and configuration of a system and/or a device that delivers the services (e.g., cloud server 220). As shown, cloud network 230 may include cloud server 220 and/or may communicate with client device 210 via one or more wired or wireless networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
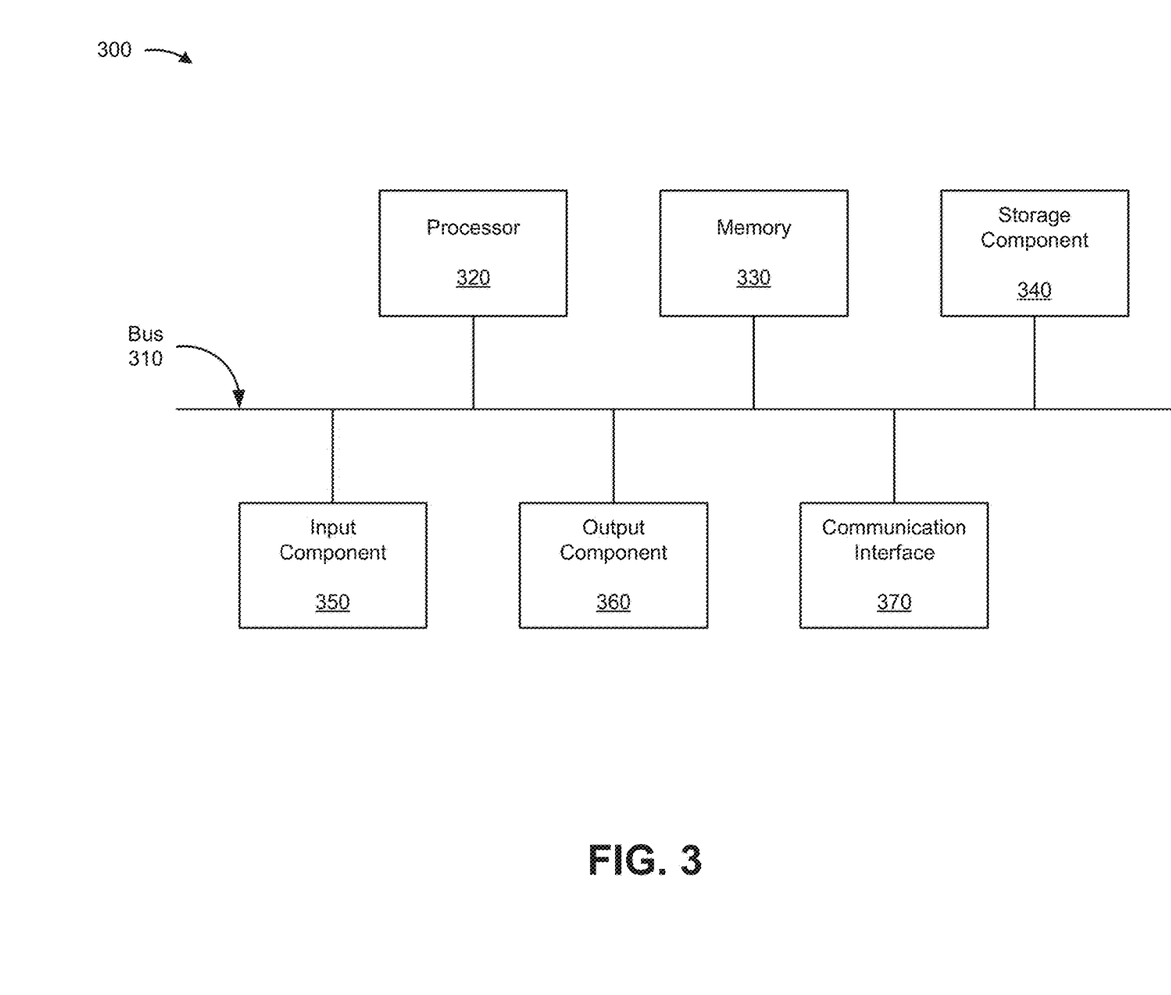
FIG. 3 is a diagram of example components of one or more devices of FIG. 2.

FIG. 3 is a diagram of example components of a device 300. Device 300 may correspond to client device 210 and/or cloud server 220. In some implementations, client device 210 and/or cloud server 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
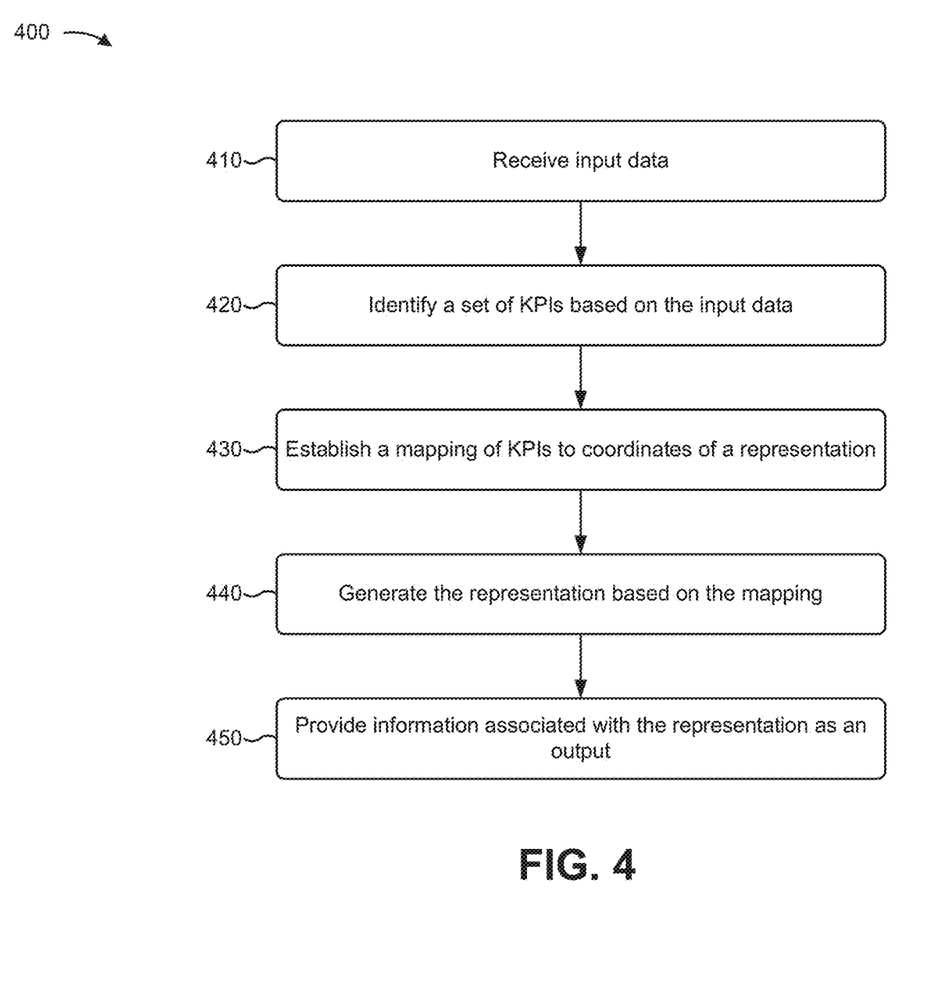
FIG. 4 is a flow chart of an example process for generating a representation of multiple metrics associated with a subject of analysis.

FIG. 4 is a flow chart of an example process 400 for generating a representation of multiple metrics associated with a subject of analysis. In some implementations, one or more process blocks of FIG. 4 may be performed by cloud server 220. In some implementations, one or more process blocks of FIG. 4 may be performed by another device or a group of devices separate from or including cloud server 220, such as client device 210.

As shown in FIG. 4, process 400 may include receiving input data (block 410). For example, cloud server 220 may receive the input data. In some implementations, cloud server 220 may receive input data identifying a set of metrics. For example, cloud server 220 may receive information identifying values for a set of metrics relating to a particular field or subject of analysis, such as a medical field (e.g., a set of blood pressure metrics or mental health metrics), a weather forecasting field (e.g., a set of precipitation metrics or humidity metrics), a telecommunications network management field (e.g., a set of signal strength metrics or packet loss rate metrics), a financial forecasting field, a group of people, or the like.

In some implementations, cloud server 220 may receive the input data from client device 210. For example, client device 210 may request that cloud server 220 generate a representation (e.g., for display via client device 210 or for performing analysis of the representation) based on a particular set of metrics, and may include the particular set of metrics as input data in the request. Additionally, or alternatively, cloud server 220 may receive the input data based on monitoring a set of devices, such as a set of sensor devices, a set of IoT devices, a set of network devices, or the like. Additionally, or alternatively, cloud server 220 may receive the input data from a set of data sources (e.g., a set of data structures). For example, cloud server 220 may identify a data structure associated with storing metrics relating to a medical field (e.g., a healthcare provider database or a healthcare payer database), and may obtain the input data from the data structure. Similarly, cloud server 220 may identify a data structure associated with storing metrics relating to a financial field (e.g., a stock price data structure or a company revenue data structure), and may obtain the input data from the data structure.

In some implementations, cloud server 220 may receive the input data periodically. For example, cloud server 220 may receive first input data from a set of sensor devices at a first time step and second input data from the set of sensor devices at a second time step. In this case, cloud server 220 may be caused to generate multiple versions of a representation, each corresponding to one of the multiple time steps, a single version of a representation including data related to each of the multiple time steps, or the like. In some implementations, cloud server 220 may receive the input data continuously. For example, when cloud server 220 monitors a set of sensor devices performing continuous data collection, cloud server 220 may receive the input data continuously. In some implementations, cloud server 220 may receive a portion of the input data based on a change to a value of a particular metric. For example, when client device 210 determines that a particular metric is changed from a first value to a second value, client device 210 may transmit information identifying the second value of the particular metric to cloud server 220. In this way, cloud server 220 reduces a utilization of network resources relative to receiving data values associated with multiple time steps but having a common value.

In some implementations, cloud server 220 may receive a first portion of input data for utilization as a training data set and a second portion of input data for utilization as a prediction set. For example, cloud server 220 may receive first healthcare metrics associated with a group of people diagnosed with a health condition to determine a correlation between a representation of the first healthcare metrics and the health condition. In this case, cloud server 220 may receive second health metrics associated with another person, and may utilize the determined correlation and a representation of the second health metrics to determine whether the other person is to be diagnosed with the health condition. In some implementations, cloud server 220 may receive a portion of input data as a verification set for verifying the correlation between the representation of the first healthcare metrics and a diagnosis of the health condition. In some implementations, cloud server 220 may receive the input data, and may select a first portion of the input data as a training set, a second portion of the input data as a verification set, or the like. In this way, cloud server 220 permits generation of a model (e.g., a set of correlations) for performing a diagnosis based on a representation of a set of metrics.

As further shown in FIG. 4, process 400 may include identifying a set of KPIs based on the input data (block 420). For example, cloud server 220 may identify the set of KPIs based on the input data. In some implementations, cloud server 220 may select a set of metrics of the input data as the set of KPIs. For example, when cloud server 220 receives input data including a particular set of metrics, cloud server 220 may select the particular set of metrics as the set of KPIs. Additionally, or alternatively, cloud server 220 may select a subset of the particular set of metrics as the set of KPIs. For example, cloud server 220 may identify one or more metrics associated with a threshold amount of change (e.g., associated with a set of time steps, a set of locations, a set of persons), and may select the one or more metrics as the set of KPIs based on the threshold amount of change. Additionally, or alternatively, cloud server 220 may identify one or more metrics associated with a threshold association with a particular outcome. For example, cloud server 220 may determine a set of coefficients of determination (i.e., a set of R squared values) for a set of metrics and a particular outcome (e.g., a particular health outcome or a particular weather outcome), and may select one or more metrics of the set of metrics based on a corresponding one or more coefficients of determination.

In some implementations, cloud server 220 may receive a user selection of a subset of the set of metrics as the set of KPIs. For example, cloud server 220 may cause information identifying the set of metrics (e.g., a name, a location, or a type) to be provided for display via a user interface of client device 210, and may detect a user interaction associated with selecting a particular metric of the set of metrics as a KPI. In some implementations, cloud server 220 may parse a document to identify a subset of the set of metrics that are to be selected as the set of KPIs. For example, cloud server 220 may apply a natural language processing technique to a document relating to a field of the input data, and may identify words within a particular proximity of one or more metrics identified in the document (e.g., a set of words indicating that the one or more metrics are to be selected as KPIs, such as "important," "critical," "differentiator," or "correlation"). In some implementations, cloud server 220 may process the input data to generate one or more KPIs. For example, cloud server 220 may generate an aggregated metric based on a set of metrics.

As further shown in FIG. 4, process 400 may include establishing a mapping of the set of KPIs to a set of coordinates of a representation (block 430). For example, cloud server 220 may establish the mapping of the set of KPIs to the set of coordinates of the representation. In some implementations, cloud server 220 may identify a set of coordinates of the representation. For example, based on a quantity of KPIs that are to be represented via the representation (e.g., a quantity of KPIs associated with a particular time step, a particular person, or a particular group of locations), cloud server 220 may identify a quantity of coordinate locations corresponding to the quantity of KPIs. In this case, cloud server 220 may generate a matrix data structure with a set of data entries corresponding to the quantity of coordinate locations, and may map the set of KPIs to the set of data entries. Although implementations, described herein, are described in terms of a matrix associated with set of coordinates, implementations, described herein, may utilize another type of data structure.

In some implementations, cloud server 220 may assign each KPI to a particular coordinate (e.g., of a matrix of coordinates). For example, cloud server 220 may select a particular KPI for a particular coordinate (e.g., [0,0] in a matrix coordinate system), and may store information associated with the particular KPI and the particular coordinate to cause the particular KPI to remain mapped to the particular coordinate when the particular KPI is altered from a first value at a first time step to a second value at a second time step. In some implementations, cloud server 220 may select a particular coordinate to which a particular KPI is to be mapped based on a characteristic of the particular KPI. For example, cloud server 220 may determine that a group of KPIs relate to a group of locations and may cause each KPI of the group of KPIs to map to a coordinate, of a group of coordinates, associated with a position in a matrix related to a position of the KPI relative to other KPIs of the group of KPIs. In other words, cloud server 220 may map a KPI related to a portion of a network in Seattle, Wash. to a coordinate that is located above and to the left of another coordinate mapped to another KPI relating to a portion of the network in Miami, Fla.

In some implementations, cloud server 220 may assign a particular KPI to a particular coordinate location based on determining that the particular KPI relates to a cloud based service. For example, cloud server 220 may determine that a group of KPIs relate to a group of services, such as a voice service, a data service, a short message system service, a web browsing service, an email service, an instant messaging service, or the like, and may map a particular KPI relating to a location of a particular service of the group of services to a particular coordinate associated with a corresponding coordinate of a group of coordinates.

In some implementations, cloud server 220 may map a group of KPIs to a group of neighboring coordinates. For example, cloud server 220 may map a group of KPIs relating to a particular location, of a set of locations, to a particular group of neighboring coordinates of a set of coordinates. Similarly, when mapping a set of health related KPIs, cloud server 220 may map a first group of KPIs related to biological health metrics to a first group of neighboring coordinates, a second group of KPIs related to mental health metrics to a second group of neighboring coordinates, a third group of KPIs related to sociological health metrics to a third group of neighboring coordinates.

In some implementations, cloud server 220 may determine a mapping of a KPI to a coordinate based on another mapping. For example, cloud server 220 may determine that, for a first representation of a first set of KPIs relating to a first medical field, a first KPI of the first set of KPIs was mapped to first coordinate of a first set of coordinates. In this case, cloud server 220 may determine that, for a second representation of a second set of KPIs relating to a second medical field, a second KPI, associated with a common type with the first KPI, is to be assigned to a second coordinate of a second set of coordinates and associated with a common coordinate location with the first coordinate. In this way, cloud server 220 may utilize stored information regarding a first representation to generate a second, similar representation, thereby reducing a utilization of processing resources relative to generating each representation without utilizing stored information.

As further shown in FIG. 4, process 400 may include generating the representation based on the mapping (block 440). For example, cloud server 220 may generate the representation based on the mapping. In some implementations, cloud server 220 may generate a set of representations based on the mapping. For example, cloud server 220 may generate a first version of the representation based on mapping a first set of KPIs at a first time step to a set of coordinates. In this case, after receiving a second set of KPIs relating to a second time step, cloud server 220 may generate a second version of the representation based on mapping the second set of KPIs to the set of coordinates (e.g., a first KPI of the first set of KPIs and a second KPI of the second set of KPIs may be mapped to the same coordinate in the first version of the representation and the second version of the representation, respectively, based on the first KPI corresponding to the second KPI).

In some implementations, cloud server 220 may assign a visualization to a KPI when generating the representation. For example, cloud server 220 may assign a particular visualization, such as a particular color, a particular shade, a particular gradient, a particular pattern, or the like, to a particular KPI based on a value of the particular KPI. In this case, cloud server 220 may cause the particular visualization to be provided for display at a location of the representation corresponding to a coordinate to which the particular KPI is mapped (e.g., a set of pixels at the location of the representation corresponding to the coordinate may be caused to provide the particular visualization).

In some implementations, cloud server 220 may normalize a value of a KPI when assigning the visualization. For example, cloud server 220 may normalize the value of the KPI to a particular scale (e.g., a 0 to 1 scale, a −1 to 1 scale, or a 0 to 100 scale) based on possible values of the KPI, observed values of the KPI, or the like. In this case, cloud server 220 may select a particular visualization for a location of the representation corresponding to the coordinate to which the KPI is mapped based on the normalized value of the KPI (e.g., cloud server 220 may assign a color of white to a normalized value of 0, light gray to a normalized value of 0.25, medium gray to a normalized value of 0.5, dark gray to a normalized value of 0.75, and black to a normalized value of 1).

As further shown in FIG. 4, process 400 may include providing information associated with the representation as an output (block 450). For example, cloud server 220 may provide information associated with the representation as the output. In some implementations, cloud server 220 may cause the representation (e.g., a set of versions of the representation at a set of time steps, regarding a set of persons, or regarding a set of locations) to be provided for display. For example, cloud server 220 may generate a user interface including the representation, and may cause the user interface to be provided for display via client device 210. In this case, cloud server 220 may identify a set of pixels corresponding to the set of coordinates, and may cause a particular pixel to provide a particular shade or color based on a visualization assigned to a corresponding particular coordinate location. For example, when the representation includes, for a particular coordinate, a particular visualization (e.g., medium gray representing a normalized value of 0.5) for a particular KPI mapped to the particular coordinate, cloud server 220 may cause a particular pixel corresponding to a coordinate location of the particular coordinate to be a medium gray shade.

In some implementations, cloud server 220 may provide contextual information relating to the representation as the output. For example, cloud server 220 may generate a user interface that provides a tooltip or another user interface element identifying a particular KPI mapped to particular coordinate location of the representation. Similarly, cloud server 220 may generate a user interface that provides a tooltip or another user interface element identifying a value of a KPI that corresponds to a visualization provided via the representation. In some implementations, cloud server 220 may provide multiple versions of the representation via a particular format. For example, cloud server 220 may generate a time-lapse video of the multiple versions that provides the multiple versions transitioning over time.

In some implementations, cloud server 220 may perform an image analysis of the representation, and may provide information relating to the image analysis as the output. For example, cloud server 220 may perform a pattern recognition analysis, a shape recognition analysis, a machine learning image recognition technique, a neural network image recognition technique, a heuristic image recognition technique, or the like to identify a correlation (e.g., a correlation relating to a change to a gradient of visualizations compared with a change to coordinate locations in the representation, a gradient of visualizations compared with a change of time between versions of the representation, a Fourier transform based analysis, or a diagnostic analysis). In some implementations, cloud server 220 may provide diagnostic information based on identifying the correlation. For example, cloud server 220 may analyze a representation of a set of medical KPIs, and may perform a diagnosis of a medical condition, a health status, or the like. Similarly, cloud server 220 may analyze a representation of a set of financial KPIs, and may predict a financial event that is to occur based on one or more previous time series alterations to financial KPI representations. In this case, cloud server 220 may provide, via the user interface, information identifying a correlation, a prediction, or the like.

In some implementations, cloud server 220 may generate an alert based on performing analysis. For example, based on the image analysis resulting in a particular diagnosis of a network outage, cloud server 220 may provide an alert that a network outage is imminent, is associated with a threshold likelihood of propagating to a particular location, or the like. In this case, cloud server 220 may generate a message and transmit the message to client device 210 for display, cause a calendar entry to be generated for a group of calendars relating to a group of people to discuss the alert (e.g., a group of calendars stored via a group of user devices utilized by the group of people), or the like.

Additionally, or alternatively, cloud server 220 may provide information identifying a recommendation. For example, cloud server 220 may determine that a particular response action results in mitigation of a network outage based an analysis of a representation at a group of times after performing the particular response action for another network outage. In this case, when cloud server 220 predicts another network outage at another time based on the representation, cloud server 220 may provide information identifying the particular response action. Additionally, or alternatively, cloud server 220 may automatically cause the particular response action to be implemented. For example, based on detecting a threshold likelihood of a network outage and determining a threshold likelihood that a particular response action is associated with preventing the network outage, cloud server 220 may cause a network configuration of one or more network devices to be altered to prevent the network outage.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
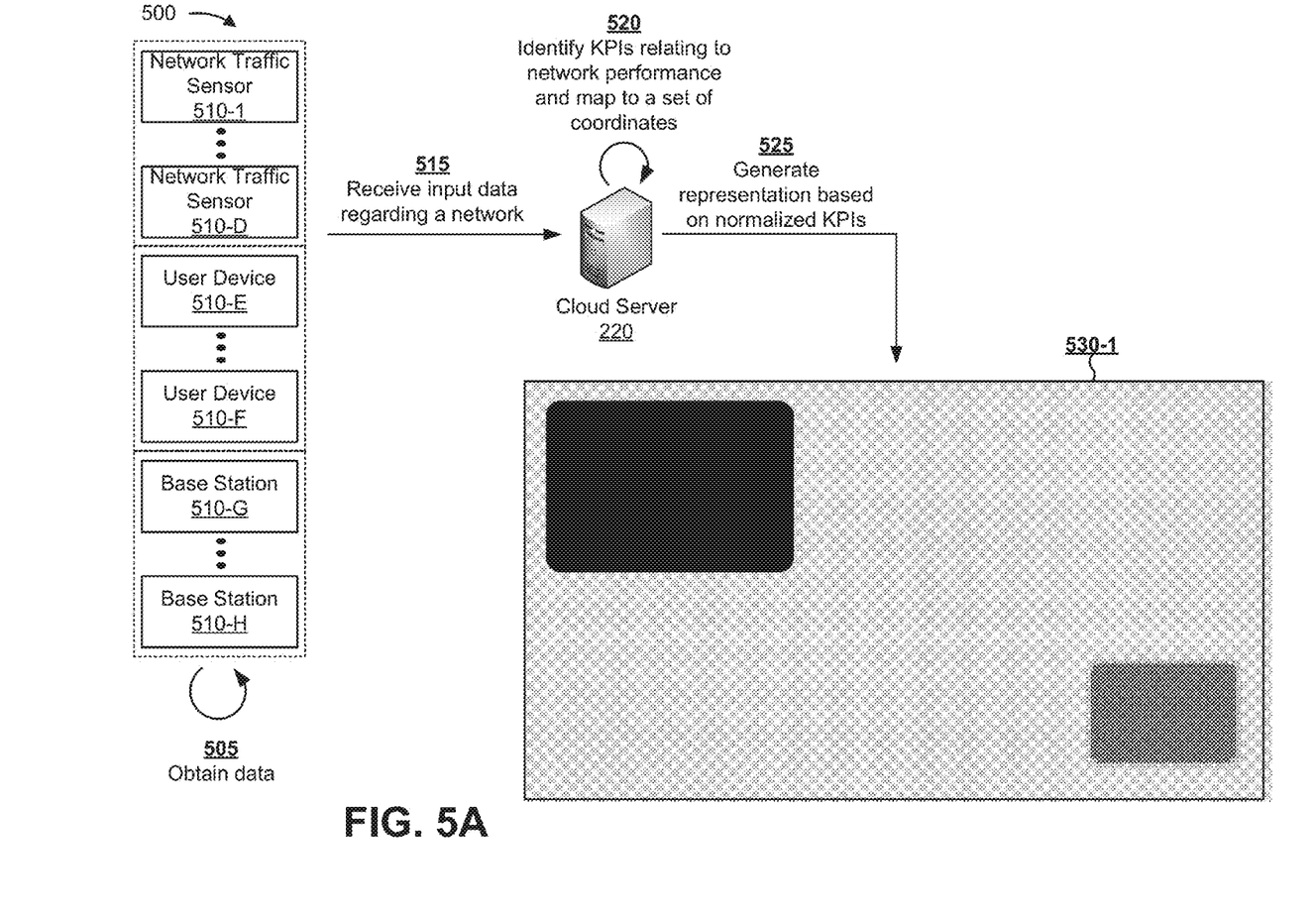
FIGS. 5A-5C are diagrams of an example implementation relating to the example process shown in FIG. 4.
Figure 5B:
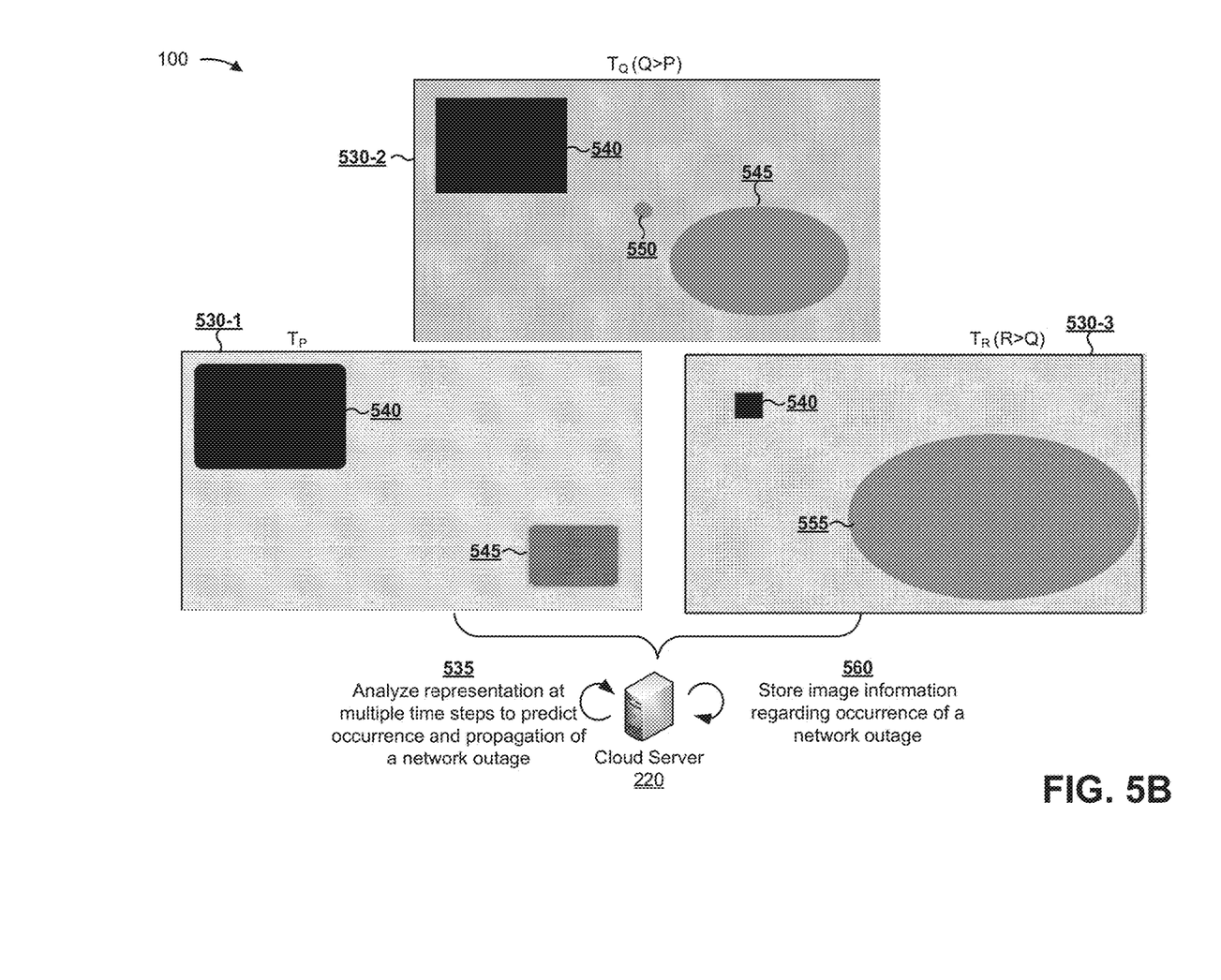
Figure 5C:
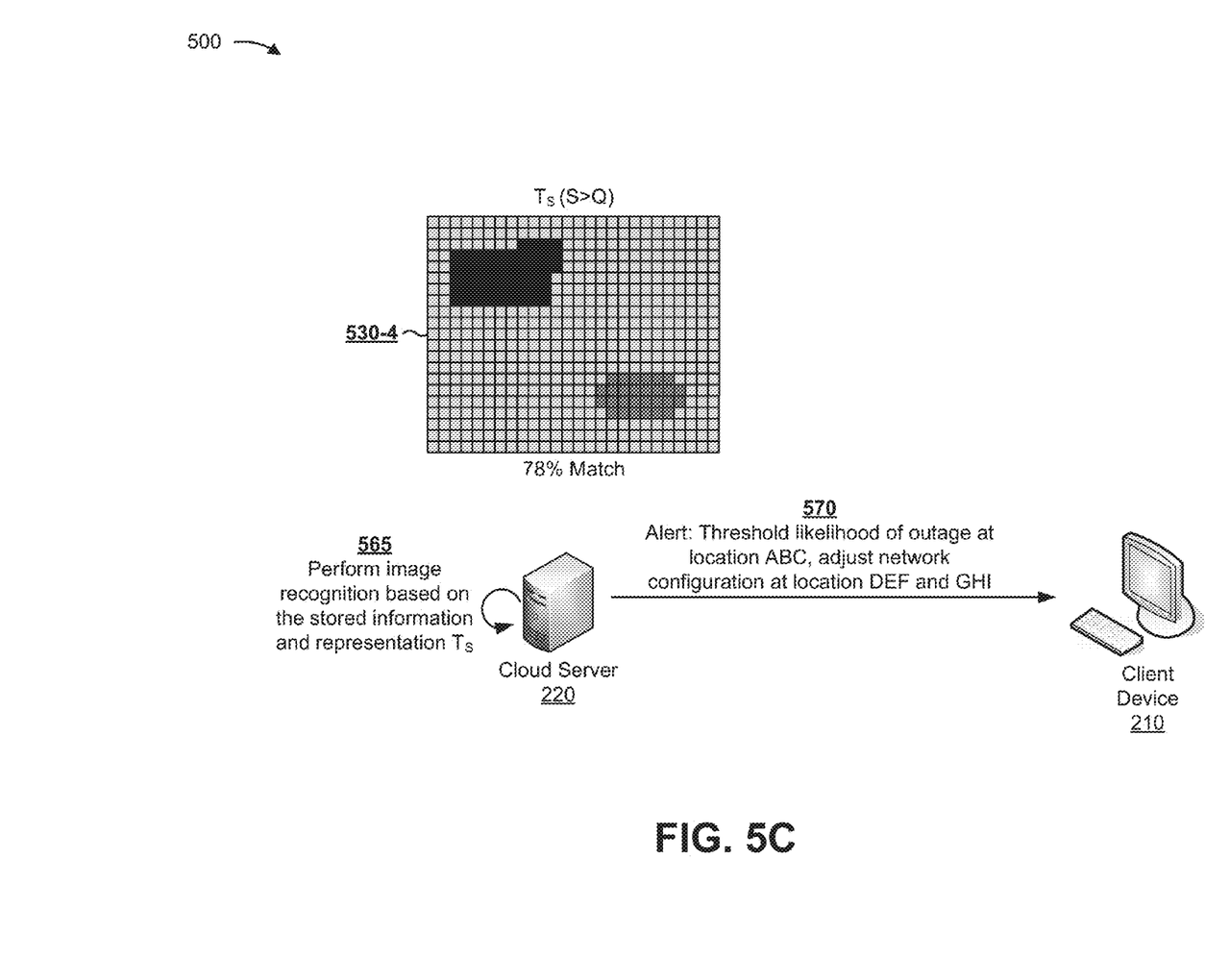

FIGS. 5A-5C are diagrams of an example implementation 500 relating to example process 400 shown in FIG. 4. FIGS. 5A-5C show an example of generating a representation of multiple metrics associated with a subject of analysis.

As shown in FIG. 5A, and by reference number 505, a set of devices 510, such as network traffic sensors 510-1 through 510-D, user devices 510-E through 510-F, base stations 510-G through 510-H, or the like, obtain data regarding a wireless network. For example, devices 510 obtain data, at multiple time steps, regarding a signal strength of the wireless network at a set of locations, a bit error rate of the wireless network at a set of locations, a frequency of the wireless network at a set of locations, or the like. As shown by reference number 515, cloud server 220 receives the data regarding the wireless network as input data. As shown by reference number 520, cloud server 220 identifies a set of KPIs relating to network performance of the wireless network, and maps the set of KPIs to a set of coordinates. For example, cloud server 220 may select a subset of metrics associated with a threshold change in value during a first time interval as the set of KPIs, and may group subsets of the set of KPIs by geographic location when mapping the set of KPIs to the set of coordinates. In this case, a first subset of four KPIs determined by network traffic sensor 510-1 and regarding a first geographic location may map to a first subset of four coordinates (e.g., [0,0] [0,1], [1,0], [1, 1]) and a second subset of four KPIs determined by network traffic sensor 510-D and regarding a second geographic location may map to a second subset of four coordinates (e.g., [6,6], [6,7], [7,6], [7,7]). In this case, the first subset of four KPIs may be the same type of KPIs as the second subset of four KPIs but determined regarding a different geographic location. As shown by reference number 525, cloud server 220 may generate a representation 530-1 (e.g., representation 530 at a first time step, $T_P$).

In another example, when network traffic sensors 510 obtain a first group of four KPIs regarding a first service, cloud server 220 may map the first group of four KPIs to the first subset of four coordinates, and when network traffic sensors 510 obtain a second group of four KPIs regarding a second service, cloud server 220 may map the second group of four KPIs to the second subset of four coordinates.

As shown in FIG. 5B, and by reference number 535, cloud server 220 analyzes the representation at multiple time steps using a pattern recognition technique to predict an occurrence of a network outage and a propagation of the network outage (e.g., a propagation from an initial outage geographic location to a group of subsequent outage geographic locations). Assume that each region represents a group of metrics associated with a network outage and a shading of each region represents a relative severity of the network outage based on a relative value of the group of metrics. For example, cloud server 220 identifies region 540 and region 545 of representation 530-1 (e.g., groups of metrics corresponding to a set of geographic locations). Similarly, cloud server 220 identifies a change to a shape of region 540 (e.g., indicating a change in a group of locations affected by the outage) and region 545 in representation 530-2 (e.g., representation 530 at a second time step, $T_Q$ (Q>P)) and identifies a region 550 in representation 530-2. Similarly, cloud server 220 identifies a change to the shape of region 540 in representation 530-3 (e.g., representation 530 at a third time step, $T_R$ (R>Q)) and identifies a region 555 (e.g., a merging of region 545 and region 550) in representation 530-3. Assume that cloud server 220 determines, based on representations 320-1 through 320-3 that a network outage occurs based on detecting a particular group of metrics at a set of geographic locations corresponding to regions 540 and 545 and propagates to a set of geographic locations corresponding to region 555 (e.g., locations corresponding to regions 540 and 545 as well as a group of additional locations adjacent to the locations corresponding to regions 540 and 545). As shown by reference number 560, cloud server 220 stores image information associated with representations 320-1 through 320-3 to permit cloud server 220 to analyze a representation associated with a subsequent time step and identify a network outage based on the representation associated with the subsequent time step.

As shown in FIG. 5C, and reference number 565, based on monitoring devices 510 and updating representation 530, cloud server 220 performs a pattern recognition technique to determine a threshold likelihood of a network outage based on the stored image information and representation 530-4 (e.g., representation 530 at a fourth time step, $T_S$ (S>R)). As shown by reference number 570, cloud server 220 transmits, to client device 210, an alert indicating the threshold likelihood of an outage at a particular geographic location (e.g., locations corresponding to region 555) within a threshold period of time, and recommending an adjustment to a network configuration of devices 510 at another geographic location (e.g., a set of geographic locations corresponding to regions 540 and 545) to prevent the network outage from occurring and/or propagating. In another example, cloud server 220 automatically causes the adjustment to the network configuration based on detecting the threshold likelihood of an outage and without transmitting an alert to client device 210.

As indicated above, FIGS. 5A-5C are provided merely as an example. Other examples are possible and may differ from what was described with regard to FIGS. 5A-5C.

In this way, cloud server 220 provides a graphical representation of multiple metrics and/or KPIs regarding a subject of analysis utilizing a mapping of the multiple metrics and/or KPIs to a set of coordinates. Moreover, based on storing the mapping, cloud server 220 reduces a utilization of processing resources relative to generating a mapping each time a representation is to be generated. Furthermore, based on utilizing a graphical representation, cloud server 220 may utilize image analysis techniques to analyze the multiple metrics and/or KPIs rather than requiring a custom analytics solution for each set of metrics or KPIs associated with each field.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 a memory; and
 one or more processors to:
   receive input data,
     the input data including a set of metrics;
   generate an image of the set of metrics based on a mapping of the set of metrics to a set of coordinates,
   perform a pattern recognition technique to analyze a particular version of the image,
     results of analyzing the particular version of the image identifying a particular outcome associated with a subject of the set of metrics; and
   provide, for display via a user interface, the particular version of the image and information identifying the particular outcome associated with the subject of the set of metrics.

2. The device of claim 1, where the one or more processors are further to:
 generate a plurality of versions of the image including the particular version of the image,
   a particular metric, of the set of metrics, mapping to a particular coordinate in each of the plurality of versions of the image, and
   the plurality of versions of the image being associated with one or more changes to a parameter of the input data shared by each metric of the set of metrics; and
 provide, for display via the user interface, the plurality of versions of the image.

3. The device of claim 2, where the parameter is time, and where the one or more processors are further to:
 analyze the plurality of versions of the image by performing the pattern recognition technique on each of the plurality of versions of the image,
   each of the plurality of versions of the image representing a different time; and
 predict an occurrence of an outcome associated with the subject of the set of metrics based analyzing the plurality of versions of the image.

4. The device of claim 1, where the one or more processors, when generating the image, are to:
 select a particular shade, of a set of shades, as a particular visualization of a particular metric, of the set of metrics, based on a value of the particular metric,
   the particular shade being at least one of a particular color, a particular pattern, or a particular gradient.

5. The device of claim 1, where the one or more processors, when generating the image, are to:
 normalize a value of a particular metric relative to one or more other values of one or more other metrics of the set of metrics; and
 assign a particular visualization to the particular metric based on normalizing the value of the particular metric.

6. The device of claim 1, where the set of metrics represents a set of key performance indicators of the input data,
 the input data including one or more other metrics not included in the set of metrics; and
 where the one or more processors are further to:
   establish the mapping of the set of metrics to the set of coordinates by mapping the set of metrics to the set of coordinates based on the set of metrics representing the set of key performance indicators of the input data.

7. The device of claim 1, where the one or more processors are further to:
 determine a particular parameter associated with a plurality of versions of the image, each version, of the plurality of versions of the image, corresponding to a particular value, of a set of values, of the particular parameter, and
the plurality of versions of the image including the particular version of the image; and
where the one or more processors, when generating the image, are to:
generate the plurality of versions of the image based on determining the particular parameter.

8. A method comprising:
receiving, by a device, input data,
the input data including a set of metrics;
generating, by the device, an image of the set of metrics based on a mapping of the set of metrics to a set of coordinates,
performing, by the device, a pattern recognition technique to analyze a particular version of the image,
results of analyzing the particular version of the image identifying a particular outcome associated with a subject of the set of metrics; and
providing, by the device and for display via a user interface, the particular version of the image and information identifying the particular outcome associated with the subject of the set of metrics.

9. The method of claim 8, further comprising:
generating a plurality of versions of the image including the particular version of the image,
a particular metric, of the set of metrics, mapping to a particular coordinate in each of the plurality of versions of the image, and
the plurality of versions of the image being associated with one or more changes to a parameter of the input data shared by each metric of the set of metrics; and
providing, for display via the user interface, the plurality of versions of the image.

10. The method of claim 9, where the parameter is time, and where the method further comprises:
analyzing the plurality of versions of the image by performing the pattern recognition technique on each of the plurality of versions of the image,
each of the plurality of versions of the image representing a different time; and
predicting an occurrence of an outcome associated with the subject of the set of metrics based analyzing the plurality of versions of the image.

11. The method of claim 8, where generating the image includes:
selecting a particular shade, of a set of shades, as a particular visualization of a particular metric, of the set of metrics, based on a value of the particular metric,
the particular shade being at least one of a particular color, a particular pattern, or a particular gradient.

12. The method of claim 8, where generating the image includes:
normalizing a value of a particular metric relative to one or more other values of one or more other metrics of the set of metrics; and
assigning a particular visualization to the particular metric based on normalizing the value of the particular metric.

13. The method of claim 8, where the set of metrics represents a set of key performance indicators of the input data,
the input data including one or more other metrics not included in the set of metrics; and
where the method further comprises:
establishing the mapping of the set of metrics to the set of coordinates by mapping the set of metrics to the set of coordinates based on the set of metrics representing the set of key performance indicators of the input data.

14. The method of claim 8, where the method further comprises:
determining a particular parameter associated with a plurality of versions of the image,
each version of the plurality of versions of the image corresponding to a particular value, of a set of values, of the particular parameter, and
the plurality of versions of the image including the particular version of the image; and
where generating the image includes:
generating the plurality of versions of the image based on determining the particular parameter.

15. A non-transitory computer-readable medium storing instructions, the instructions comprising:
one or more instructions which, when executed by at least one processor, cause the at least one processor to:
receive input data,
the input data including a set of metrics;
generate an image of the set of metrics based on a mapping of the set of metrics to a set of coordinates,
perform a pattern recognition technique to analyze a particular version of the image,
results of analyzing the particular version of the image identifying a particular outcome associated with a subject of the set of metrics; and
provide, for display via a user interface, the particular version of the image and information identifying the particular outcome associated with the subject of the set of metrics.

16. The non-transitory computer-readable medium of claim 15, where the one or more instructions further cause the at least one processor to:
generate a plurality of versions of the image including the particular version of the image,
a particular metric, of the set of metrics, mapping to a particular coordinate in each of the plurality of versions of the image, and
the plurality of versions of the image being associated with one or more changes to a parameter of the input data shared by each metric of the set of metrics; and
provide, for display via the user interface, the plurality of versions of the image.

17. The non-transitory computer-readable medium of claim 16, where the parameter is time, and
where the one or more instructions further cause the at least one processor to:
analyze the plurality of versions of the image by performing the pattern recognition technique on each of the plurality of versions of the image,
each of the plurality of versions of the image representing a different time; and
predict an occurrence of an outcome associated with the subject of the set of metrics based analyzing the plurality of versions of the image.

18. The non-transitory computer-readable medium of claim 15, where the one or more instructions, that cause the at least one processor to generate the image, further cause the at least one processor to:
select a particular shade, of a set of shades, as a particular visualization of a particular metric, of the set of metrics, based on a value of the particular metric,
the particular shade being at least one of a particular color, a particular pattern, or a particular gradient.

19. The non-transitory computer-readable medium of claim 15, where the one or more instructions, that cause the at least one processor to generate the image, further cause the at least one processor to:
- normalize a value of a particular metric relative to one or more other values of one or more other metrics of the set of metrics; and
- assign a particular visualization to the particular metric based on normalizing the value of the particular metric.

20. The non-transitory computer-readable medium of claim 15, where the set of metrics represents a set of key performance indicators of the input data,
- the input data including one or more other metrics not included in the set of metrics; and
- where the one or more instructions further cause the at least one processor to:
  - establish the mapping of the set of metrics to the set of coordinates by mapping the set of metrics to the set of coordinates based on the set of metrics representing the set of key performance indicators of the input data.

* * * * *